（12） United States Patent
Cohly et al.

(10) Patent No.: US 11,952,273 B2
(45) Date of Patent: Apr. 9, 2024

(54) CLEAN GREEN FUEL TECHNOLOGY

(76) Inventors: Hari Har Parshad Cohly, Jackson, MS (US); Rajendram V. Rajnarayanan, East Amherst, NY (US); Bharat Subodh Agrawal, Bogart, GA (US); Hui Chu Tsai, Singapore (SG)

( * ) Notice: Subject to any disclaimer, the term of this patent is extended or adjusted under 35 U.S.C. 154(b) by 279 days.

(21) Appl. No.: 13/323,738

(22) Filed: Dec. 12, 2011

(65) Prior Publication Data

US 2012/0318660 A1 Dec. 20, 2012

Related U.S. Application Data

(60) Provisional application No. 61/490,377, filed on May 26, 2011.

(51) Int. Cl.
*C01B 3/08* (2006.01)
*B01J 7/02* (2006.01)
*B01J 19/12* (2006.01)
*C01F 7/428* (2022.01)

(52) U.S. Cl.
CPC .................. *C01B 3/08* (2013.01); *B01J 7/02* (2013.01); *B01J 19/127* (2013.01); *C01F 7/428* (2013.01); *Y02E 60/36* (2013.01)

(58) Field of Classification Search
CPC . B01J 7/02; B01J 19/127; C01F 7/428; C01B 3/08; Y02E 60/36
USPC .................................................... 204/157.52
See application file for complete search history.

(56) References Cited

U.S. PATENT DOCUMENTS

| 3,334,217 | A | * | 8/1967 | Bickler | F21S 8/006 |
| | | | | | 136/243 |
| 3,858,051 | A | * | 12/1974 | Smith | B01J 19/242 |
| | | | | | 422/186 |
| 4,125,775 | A | * | 11/1978 | Chodak | F21V 9/02 |
| | | | | | 250/504 R |
| 4,227,977 | A | * | 10/1980 | Grantham | C25B 1/003 |
| | | | | | 205/340 |
| 4,641,227 | A | * | 2/1987 | Kusuhara | F21S 8/006 |
| | | | | | 362/1 |
| 5,143,047 | A | * | 9/1992 | Lee | 126/263.05 |
| 6,130,283 | A | * | 10/2000 | Nippa et al. | 423/629 |
| 6,395,252 | B1 | * | 5/2002 | Getty et al. | 423/657 |
| 6,403,007 | B1 | * | 6/2002 | Kido et al. | 423/629 |
| 6,440,385 | B1 | * | 8/2002 | Chaklader | 423/657 |
| 6,506,360 | B1 | * | 1/2003 | Andersen et al. | 423/657 |
| 6,590,149 | B2 | * | 7/2003 | Adelhelm | F21S 8/006 |
| | | | | | 136/244 |
| 6,638,493 | B2 | * | 10/2003 | Andersen et al. | 423/657 |
| 7,144,567 | B2 | * | 12/2006 | Andersen | 423/657 |
| 2007/0267056 | A1 | * | 11/2007 | Hishikawa | F21S 8/006 |
| | | | | | 136/246 |
| 2009/0010837 | A1 | * | 1/2009 | Yabe | B01J 19/127 |
| | | | | | 423/657 |
| 2009/0321244 | A1 | * | 12/2009 | Smith | B01J 19/127 |
| | | | | | 204/157.52 |
| 2010/0209338 | A1 | * | 8/2010 | Miki | H01M 8/04208 |
| | | | | | 252/182.33 |
| 2010/0224502 | A1 | * | 9/2010 | Carey | C01B 3/04 |
| | | | | | 205/340 |
| 2011/0084487 | A1 | * | 4/2011 | Davidson | C01B 3/08 |
| | | | | | 290/52 |

OTHER PUBLICATIONS

NASA, "Strange Moonlight," p. 2, online Sep. 28, 2006, available at http://science1.nasa.gov/science-news/science-at-nasa/2006/28sep_strangemoonlight/.*
"Intensity," available at http://www.princeton.edu/~achaney/tmve/wiki100k/docs/Intensity_(physics).html).*
National Climatic Data Center, online at http://www.ncdc.noaa.gov/cdo-web/.*
U.S. Naval Observatory Complete Sun and Moon Data for One Day, online at http://aa.usno.navy.mil/data/docs/RS_OneDay.php.*
Flinn Scientific, "The Bottomless Bottle Explosion," Pub. No. 91626 (2009).*
Streicher, "The Dissolution of Aluminum in Sodium Hydroxide Solutions," J. Electrochem. Soc., vol. 93, No. 6, pp. 285-316 (Jun. 1948).*
Colorado University, Physics 1230 Overview Ch. 9, 10, & 13 (2009).*
Belitskus, "Reaction of Aluminum with Sodium Hydroxide Solution as a Source of Hydrogen," J. Electrochem. Soc., vol. 117, No. 8, pp. 1097-1098 (1970).*
"A CD spectrometer," p. 6, available online at http://www.cs.cmu.edu/~zhuxj/astro/html/spectrometer.html.*
Sun and Moon Data for One Day, day selected to be Feb. 24, 2011, calculated at http://aa.usno.navy.mil/data/docs/RS_OneDay.php.*
Sun and Moon Data for One Day, day selected to be Feb. 21, 2011, calculated at http://aa.usno.navy.mil/data/docs/RS_OneDay.php.*
Sun and Moon Data for One Day, day selected to be Feb. 27, 2011, calculated at http://aa.usno.navy.mil/data/docs/RS_OneDay.php.*
"Noxious Night Lights," The Economist, Dec. 21, 2010, p. 1, para. 4.*
"Phases of the Moon," U.S. Naval Observatory Astronomical Applications Dept., input Year 2011 at http://aa.usno.navy.mil/data/docs/MoonPhase.php.*
Bortle, "Introducing the Bortle Dark-Sky Scale," Sky & Telescope Feb. 2001, pp. 126-129.*

(Continued)

*Primary Examiner* — Nicholas A Smith
(74) *Attorney, Agent, or Firm* — Butler Snow LLP

(57) ABSTRACT

We disclose herein a viable, cost efficient method for the instantaneous production of hydrogen gas. Hydrogen gas production is increased by utilizing solar and lunar energy. The hydrogen gas is generated spontaneously by the reaction of sodium hydroxide and aluminum as corrosion occurs, forming a layer of aluminum oxide upon the aluminum. This aluminum oxide layer prevents further reaction of sodium hydroxide and aluminum, and thus no more hydrogen gas is produced. Production of aluminum oxide can be bypassed by adding acetic acid or sodium acetate to the reaction. In this reaction the products are aluminum hydroxide and hydrogen gas. Thus, we disclose herein a method that prevents the formation of aluminum oxide by the use of sodium acetate or acetic acid, the use of iron as a catalyst, and the enhancement of the reaction using natural light.

10 Claims, No Drawings

(56) References Cited

OTHER PUBLICATIONS

"Spontaneous." Merriam-Webster.com. Merriam-Webster, n.d. Web. May 15, 2018.*
W.C. Lattin and V.P. Utgikar, Transition to hydrogen economy in the United States: a 2006 status report, Int J Hydrogen Energy 32 (15) (2007), pp. 3230-3237.
C. Wu, H.M. Zhang, and B.L. Yi, Recent advances in hydrogen generation with chemical methods, Progr Chem 17 (3) (2005), pp. 423-429 [in Chinese].
U.S. Department of Energy. Office of fossil energy—Hydrogen Program Plan: Hydrogen from Natural Gas and Coal: the Road to a Sustainable Energy Future. 2003.
S.M. Kotay and D. Das, Biohydrogen as a renewable energy resource—prospects and potentials, Int J Hydrogen Energy 33 (1) (2008), pp. 258-263.
O.V. Kravchenko, K.N. Semenenko, B.M. Bulychev, and K.B. Kalmykov, Activation of aluminum metal and its reaction with water, J Alloys Compd 397 (2005), pp. 58-62.
H.Z. Wang, D.Y.C. Leung, M.K.H. Leung, and M. Ni A review on hydrogen production using aluminum and aluminum alloys Department of Mechanical Engineering, The University of Hong Kong, Pokfulam Road, Hong Kong 2008.
Venere, Emil (May 15, 2007). "New process generates hydrogen from aluminum alloy to run engines, fuel cells".
Cohly HH, Panja A, Reno WL 3rd, Obenhuber D, Koelle MS, Das SK, Angel MF, Rao MR. Department of Surgery, University of Mississippi Medical Center, 2500 North State Street, Jackson, Mississippi, 39216-4505, USA. 2005.
A.E. Sheindlin and A.Z. Zhuk, Concept of aluminum hydrogen energy industry, Russ J Gen Chem 77 (4) (2007), pp. 778-782.
John Petrovic and George Thomas, Consultants to the DOE Hydrogen Program: Reaction of Aluminum with Water to Produce Hydrogen. 2008.
I. E. Smith, Hydrogen generation by means of the aluminum/water reaction; Journal of Hydronautics (1972), vol. 6, #2, 106-109.
D. Belitskus, "Reaction of Aluminum With Sodium Hydroxide Solution as a Source of Hydrogen", J. Electrochem. Soc., 117, 1097-1099 (1970).
Lee, Li, Oh, Kim and, Noike, Effect of Iron concentration on continues H2 production using membrane bioreactor. 2009.

* cited by examiner

CLEAN GREEN FUEL TECHNOLOGY

CROSS-REFERENCES TO RELATED APPLICATIONS

This application claims the benefit of U.S. Provisional Application No. 61/490,377 filed May 26, 2011, incorporated herein by reference in its entirety.

FIELD OF THE INVENTION

The present invention is generally directed toward an improved method of producing hydrogen.

BACKGROUND OF THE INVENTION

Fossil fuel supplies are dwindling and pollution from the burning of fossil fuels is devastating to the environment. A cost efficient green alternative fuel is needed for the sustainability of the population and the protection of the environment. Hydrogen gas is the likely successor of fossil fuel (Lattin and Utgikar, 2007). Hydrogen gas is a known non-toxic green alternative fuel that burns more efficiently than gasoline. However, the production of hydrogen gas to this point has been very expensive.

Hydrogen gas can be produced through electrolysis of water, chemical means, and biological means. (Wu, 2005) Electrolysis is too expensive. (US Department of Energy, 2003) and the biological production of hydrogen gas has a low conversion efficiency (Kotay and Das, 2008). This leaves the chemical production of hydrogen gas as the most cost efficient method of hydrogen gas production. The chemical process that is most widely accepted as the frontrunner in hydrogen gas production is reacting aluminum with water and sodium hydroxide as a promoter of this reaction (Kravchenko, 2005). Aluminum oxide, a white precipitate, creates a thin layer around the aluminum inhibiting the reaction between aluminum and sodium hydroxide (Wang, 2008). The aluminum oxide problem is most commonly dealt with by creating aluminum alloys. Most recently, in 2007, the alloy of aluminum and gallium in water was shown to generate hydrogen. The gallium in this reaction prevents the aluminum oxide from forming a layer upon the aluminum (Venere, 2007 and Frank Markus, 2008). This process is expensive because gallium is a rather expensive metal and creating an alloy is an expensive method. There exists a need for an environmentally favorable fuel which would be an economically viable solution to the dependence of damaging fossil fuels. A need to fulfill the world demands of energy requires an accessible, ecologically attractive, and easily stored and transported fuel of the future. Hydrogen gas spontaneously and continuously produced using natural energy is the most feasible solution to this problem.

SUMMARY OF THE INVENTION

We disclose herein a method for the spontaneous production of hydrogen gas. The gas is produced upon the reaction of aluminum and iron with sodium hydroxide and sodium acetate in the presence of direct colored natural light. The sodium acetate allows aluminum hydroxide to form, which does not occlude the surface of aluminum which would reduce the reactivity of aluminum. Iron will not react with sodium hydroxide unless the iron surface and the aluminum surface are touching each other. Hydrogen gas production occurs not only on the aluminum surface but also on the entire iron surface in this reaction.

A glass transparent container exposed to natural colored light further enhances the production of hydrogen gas. Our method exploits solar energy as well as lunar energy to increase hydrogen gas production under the conditions of our chemical reaction.

Furthermore, our method is novel and more economical because we utilize iron and aluminum, which are the most common metals in the Earth and most common metals in the Earth's crust (Sheindlin and Zhuk, 2007) Additionally, sodium acetate and natural light enhances hydrogen gas production by not corroding the aluminum surface and providing photonic energy. The method disclosed herein has the additional advantage in that it can produce hydrogen gas whenever needed therefore there is no need for storage of hydrogen gas.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

In the method disclosed herein, hydrogen gas is spontaneously produced once aluminum and iron, copper, tin, gold, or platinum reacts with sodium hydroxide and sodium acetate in the presence of direct colored natural light. The sodium acetate or acetic acid allows aluminum hydroxide to form. Iron and the other afore-mentioned metals will not react with sodium hydroxide unless the iron surface and the aluminum surface are touching each other. Hydrogen gas production occurs not only on the entire aluminum surface but also on the entire iron or the above mentioned metals' surface in this reaction.

A glass transparent container exposed to natural colored light further enhances the production of hydrogen gas. Previously it has been shown that water exposed to the visible spectrum changes its biological, chemical, and physical properties. We are exploiting solar energy as well as lunar energy to increase hydrogen gas production under the conditions of our chemical reaction. Glass allows more light to pass through than plastic. Our method more economical because we utilize iron and aluminum, which are the most common metals in the Earth and the most common metals in the Earth's crust. Furthermore, sodium acetate and natural light enhances hydrogen gas production by not corroding the aluminum surface and providing photonic energy. In addition, our method can produce hydrogen gas whenever needed therefore there is no need for storage of hydrogen gas.

Acetic Acid/Sodium Acetate

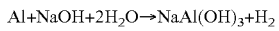

The reaction of aluminum and water has been well documented using sodium hydroxide as a promoter. Several attempts have been used to enhance the reaction by using other metal alloys as catalyst. Our approach is unique because we use iron or the previously mentioned metals in their raw state that is easily available in the world. The other unique aspect of our approach is that the metals when just physically attached to the aluminum provide a whole new surface on which hydrogen gas is generated. We believe this reaction is a very novel reaction in which the hydrogen gas is induced in a surface that by itself is inert to the underlying promoter, sodium hydroxide.

The prior art of hydrogen collection has been well documented. Hydrogen gas can be produced by chemical means instantaneously thus eliminating the problem of storage. The prior art has utilized the addition of a liquid alloy of gallium and aluminum reacting with water to produce instantaneous production of hydrogen with the cost still required for the production of the alloy. The utilization of gallium adds further financial burden to hydrogen gas production because of the cost of gallium. Our disclosed method utilizes common reagents, which require no special manufacturing such as the creation of an alloy which lifts the economic burden in the cost of generating hydrogen.

One benefit of hydrogen is that it can be generated via a chemical reaction in which the chemical reactants are easily available and are easily stored. In the art, there exist a good number of processes for the generation of hydrogen both directly and as a byproduct employing chemical reactions. The mere fact that hydrogen gas is generated instantaneously undermines the problem of hydrogen gas storage.

Mercury, a heavy metal, has been used as a catalyst for the oxidation of aluminum as is put forth in U.S. Pat. No. 3,540,854 and an organic catalyst in the formation of hydrogen from a series of metals including aluminum are set forth in U.S. Pat. No. 3,348,919.

Experiment 1: Effect of Sodium Hydroxide and Aluminum Rods

The production of hydrogen gas, via the reaction between sodium hydroxide and aluminum, is a well-known method of hydrogen gas production. (Smith, 1972, Belitskus, 1970) We took 400 ml of 10% sodium hydroxide solution in a glass bottle with an aluminum rod (38.1 cm wire weighing 13 grams with an internal diameter of 3 mm) that produced hydrogen gas. Along with hydrogen gas generated is aluminum oxide. Aluminum oxide is water insoluble. The aluminum oxide accumulated a layer upon the aluminum rod. Thus after a few hours the aluminum rod was no longer exposed to the sodium hydroxide solution. Thus, aluminum oxide causes the reaction between sodium hydroxide and aluminum to come to a halt, ergo halting the hydrogen gas production. It was observed that very little aluminum oxide is formed when the aluminum is completely submerged in sodium hydroxide. We verified that the gas we produced was in fact hydrogen by reacting it with oxygen, which results in combustion.

Experiment 2: Effect of Acetic Acid

Solutions of 80 ml of 10% NaOH and 3 ml of 5% Acetic Acid were placed in a beaker with an aluminum rod completely submerged in these solutions. The reaction yielded hydrogen gas and aluminum hydroxide. Aluminum hydroxide is a water soluble substance. The aluminum hydroxide remained in the solution but does not create an inhibiting coat around the aluminum rod. The aluminum rod continued to react with the solution, producing hydrogen gas. The reaction only came to a halt when the aluminum rod completely reacted with the solution.

Experiment 3: Effect of Sodium Acetate

Solutions of 80 ml of 10% NaOH and 3 ml of 1% sodium acetate were placed in a beaker with an aluminum rod completely submerged in these solutions. The reaction yielded hydrogen gas and aluminum hydroxide. Therefore, the reaction continued until the aluminum rod completely reacted with the solution.

Experiment 4: Effect of Platinum/Copper/Gold/Tin

A platinum wire was inserted in a 400 ml of 10% NaOH in a glass bottle. There was no reaction. Platinum wire was single knotted to an aluminum rod enabling it to hang from the aluminum rod. 400 ml of 10% NaOH was reacted with the aluminum and platinum completely submerged in these solutions. The aluminum rod and platinum both produced instantaneous hydrogen gas production. In another embodiment, copper tin and gold were also used as metals like platinum and similarly they produced hydrogen gas. Iron being easily available was pursued for further experimentation.

Experiment 5: Effect of Iron Nail

A glass bottle with 400 ml of 10% NaOH was reacted with an iron nail, which had an aluminum rod wrapped around and attached to it completely submerged in the solutions. Both the aluminum rod and iron nail surface produced hydrogen gas.

Experiment 6: Effect of Heat

Three 250 ml Erlenmeyer flask containing were filled with 160 ml 10% NaOH and 6 ml of 5% acetic acid. Of these three, two were heated in a microwave at the same temperature and one was kept at room temperature. One was heated for 1 minute. The other one was heated for 2 minutes. All three solutions had an aluminum rod placed in it; the aluminum rod was placed in the heated solutions after the solutions were heated. The one heated for 1 minute produced more hydrogen gas than the room temperature solution. The one heated for 2 minutes produced a significantly larger amount of hydrogen gas than the one heated for 1 minute.

Experiment 7: Effect of Direct Solar Radiation

Two glass bottles with 400 ml of 10% NaOH and 25 ml of sodium acetate solution was reacted with an aluminum rod (38.1 cm; 13 gms; 3 mm diameter) with an iron nail attached to it, one was exposed to the sun, and the other was not kept in the sun but kept in the lab room lit by fluorescent lights. The glass bottle exposed to the sun produced about 1.5 times greater than that exposed to fluorescent lights kept at room temperature.

Experiment 8: Effect of Specific Color of Visible Spectrum of Sunlight

Two glass bottles containing 400 ml of 10% sodium hydroxide solution reacted with an aluminum rod (38.1 cm, 3 mm diameter, 13 gm) that has an iron nail (6.4 cm, 8 gm) attached to it. The containers were wrapped in cellophane paper, one in red and one in indigo. The containers were exposed to sunlight. The red container produced more hydrogen gas than the indigo container by 10%.

Experiment 9: Quantization of Hydrogen Gas when Compared with Indigo and Red Colored Containers Two glass bottles contained 400 ml of 10% sodium hydroxide plus 1% 25 ml sodium acetate solution reacted with an aluminum rod that has an iron nail (6.4 cm, 8 gm) attached to it. The containers were wrapped with cellophane paper, one in red and one in indigo. The containers were each connected by polypropylene tubes to an Erlenmeyer flask containing 250 ml water. These flasks were inverted and water was displaced via the hydrogen gas production. The rate of production was 30L per hour for the red bottle and about 27L per hour for the indigo bottle. This experiment was done during daylight.

Experiment 10: Effect of Specific Color of Visible Spectrum of Moonlight

Two glass bottles contained 400 ml of 10% sodium hydroxide solution plus 1% 25 ml sodium acetate solution reacted with an aluminum rod (38.1 cm, 3 mm diameter, 13 gm) that has an iron nail (6.4 cm, 8 gm) attached to it. The containers were wrapped in cellophane paper, one in red and one in indigo. The containers were exposed to moonlight. The moonlight enhanced the production of hydrogen gas. The indigo container produced 28% more hydrogen gas than the red container.

Results and Discussion of the Examples

The aluminum oxide, which inhibits the reaction between sodium hydroxide and aluminum, has been a problem many investigators have tried to solve. It has been suggested that aluminum oxide can be recycled, which allows for renewable of aluminum but the process is expensive and will not allow the reaction to continue (Petrovic and Thomas, 2008). This will only prolong the inevitable so this process is expensive. The use of aluminum alloys with different metals such as, gallium, tin, rhenium, indium, lead, bismuth, magnesium, or calcium are more reactive but are not readily available and are expensive metals. In addition, aluminum alloys have been made which can be stored at ambient temperature because they decompose, thus they cost more money to use (Wang, Leung, Leung, and Ni, 2008). The use of sodium acetate is inexpensive and easy. No alloy must be made in this reaction. This process is much more inexpensive because one must pay only for sodium acetate, which is cheap.

Platinum is a noble metal, therefore platinum does not react readily. Platinum is a very inert metal. Platinum does not react if placed in a solution of sodium hydroxide. Only when aluminum is added, does platinum react with sodium hydroxide to produce hydrogen gas. This was true for gold too. However, platinum and gold are very expensive. The replacement of platinum with iron, tin or copper is economically more feasible. Iron is the most common metal in the world. Iron has been used in hydrogen gas production before. Iron concentration is a key factor affecting the fermentation pathway for hydrogen production in a membrane bioreactor of continuous hydrogen production. (Lee, Li, Oh, Kim, Noike, 2009). Iron also does not react if placed in a solution of sodium hydroxide. Only when aluminum is added to the solution does iron produce hydrogen gas as well. The fact that iron tin or copper only have to be touching aluminum and can produce hydrogen gas allows for cheaper production of hydrogen gas because no alloy must be constructed.

Hydrogen gas production is enhanced with an increase in temperature. Heating the solution via microwave or other heating devices is expensive. The fact that sunlight generates heat and enhances the production of hydrogen gas makes this method cheap. The sun is free energy anyone can utilize. The enhancement of hydrogen gas production using the visible spectrum makes the production cost decrease even more. Red creating more gas than indigo demonstrates the difference of energy concentration in the visible spectrum, red and indigo are on the opposite ends of the visible spectrum. The fact that even moonlight enhances the production of hydrogen gas decreases the cost of production even more so. The moon like the sun is free form of photonic energy and available to all. Many scientists only think sunlight can give off large enough amounts of energy for commercial use but now the moon will also be used for energy. The inverse relationship between the visible spectrum and production of hydrogen gas during day and night allows for cheaper production of hydrogen gas.

We believe our method is novel and the most economical method of hydrogen gas production known. All the material used in our method can be found around the house and easily at your local hardware store. We use no expensive metals. We use the most common metal in the Earth's crust and the most common metal on the face of the Earth. Sodium Hydroxide has been commercially produced as a detergent. Sodium Acetate is the combination of Sodium Hydroxide and Acetic Acid also known as vinegar. Sodium acetate is also cheap and easily available. The reaction is instantaneous, thus there is no need to store the gas for an extended period of time. Hydrogen gas also is not harmful to the environment. It releases no greenhouse gases, thus the environment will not be harmed. The ability to produce Hydrogen Gas on a large scale is possible using our method.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCES

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

W. C. Lattin and V. P. Utgikar, Transition to hydrogen economy in the United States: a 2006 status report, *Int J Hydrogen Energy* 32 (15) (2007), pp. 3230-3237.

C. Wu, H. M. Zhang, and B. L. Yi, Recent advances in hydrogen generation with chemical methods, *Progr Chem* 17 (3) (2005), pp. 423-429 [in Chinese].

U.S. Department of Energy. Office of fossil energy—Hydrogen Program Plan: Hydrogen from Natural Gas and Coal: the Road to a Sustainable Energy Future. 2003

S. M. Kotay and D. Das, Biohydrogen as a renewable energy resource—prospects and potentials, *Int J Hydrogen Energy* 33 (1) (2008), pp. 258-263.

O. V. Kravchenko, K. N. Semenenko, B. M. Bulychev, and K. B. Kalmykov, Activation of aluminum metal and its reaction with water, *J Alloys Compd* 397 (2005), pp. 58-62.

H. Z. Wang, D. Y. C. Leung, M. K. H. Leung, and M. Ni A review on hydrogen production using aluminum and aluminum alloys Department of Mechanical Engineering, The University of Hong Kong, Pokfulam Road, Hong Kong 2008

Venere, Emil (May 15, 2007). "New process generates hydrogen from aluminum alloy to run engines, fuel cells".

Cohly H H, Panja A, Reno WL 3rd, Obenhuber D, Koelle M S, Das S K, Angel M F, Rao M R. Department of Surgery, University of Mississippi Medical Center, 2500 North State Street, Jackson, Mississippi, 39216-4505, USA. 2005

A. E. Sheindlin and A. Z. Zhuk, Concept of aluminum hydrogen energy industry, *Russ J Gen Chem* 77 (4) (2007), pp. 778-782.

John Petrovic and George Thomas, Consultants to the DOE Hydrogen Program: Reaction of Aluminum with Water to Produce Hydrogen. 2008

I. E. Smith, Hydrogen generation by means of the aluminum/water reaction; Journal of Hydronautics (1972), vol. 6, #2, 106-109

D. Belitskus, "Reaction of Aluminum With Sodium Hydroxide Solution as a Source of Hydrogen", J. Electrochem. Soc., 117, 1097-1099 (1970).

Lee, Li, Oh, Kim and, Noike, Effect of Iron concentration on continues H2 production using membrane bioreactor. 2009

We claim:

1. A method for producing hydrogen gas comprising combining solid aluminum, sodium hydroxide, and acetic acid with a metal selected from the list consisting of iron, copper, tin, gold and platinum in a reaction, and exposing said reaction to natural light, wherein hydrogen gas production is increased by such exposure and wherein the increased production is as compared to a reference reaction that is not exposed to natural light but otherwise the same, and wherein said metal provides a surface for hydrogen gas production separate from said solid aluminum, further wherein the hydrogen gas production takes place and remains at or above room temperature.

2. The method of claim 1 wherein said acetic acid prevents the formation of aluminum oxide and forms aluminum hydroxide.

3. The method of claim 1 wherein said metal serves as a catalyst for the reaction.

4. The method of claim 1 wherein said light passes through a transparent color Mass container.

5. The method of claim 1 wherein said light is daylight, and said daylight passes through a transparent container.

6. The method of claim 5 wherein said daylight passes through a transparent colored container.

7. The method of claim 5 wherein said daylight passes through a red color impregnated transparent container.

8. The method of claim 1 wherein hydrogen gas production on the surface of iron or other metals such as copper, tin, gold or platinum in the reaction depends on the physical touching of the metal surface with said solid aluminum and complete submergence in sodium hydroxide and acetic acid solution.

9. A method for enhancing the production of hydrogen comprising combining solid aluminum, sodium hydroxide, sodium acetate and iron in a reaction, and exposing said reaction to natural light, wherein hydrogen gas production is increased by such exposure and takes place and remains at or above room temperature, further wherein the increased production is as compared to a reference reaction that is not exposed to natural light but otherwise the same, and wherein said iron provides a surface for hydrogen gas production separate from said solid aluminum.

10. The method of claim 9 wherein said sodium acetate prevents the formation of aluminum oxide and forms aluminum hydroxide.

* * * * *